(12) United States Patent
Yu et al.

(10) Patent No.: US 9,672,129 B2
(45) Date of Patent: Jun. 6, 2017

(54) TESTING TRAY

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Long Yu, Shenzhen (CN); Fang-Quan Li, Shenzhen (CN); Ju-Lan Hao, Shenzhen (CN); Li-Jun Li, Shenzhen (CN); Yan-Bin Liu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 110 days.

(21) Appl. No.: 14/618,109

(22) Filed: Feb. 10, 2015

(65) Prior Publication Data
US 2015/0233968 A1 Aug. 20, 2015

(30) Foreign Application Priority Data
Feb. 17, 2014 (CN) .......................... 2014 1 0052636

(51) Int. Cl.
*G01R 1/04* (2006.01)
*G06F 11/273* (2006.01)

(52) U.S. Cl.
CPC ................................. *G06F 11/273* (2013.01)

(58) Field of Classification Search
CPC .................................................... G06F 11/273
See application file for complete search history.

(56) References Cited

U.S. PATENT DOCUMENTS

| | | | |
|---|---|---|---|
| 2009/0190922 A1* | 7/2009 | Ohta | H04B 10/25 398/17 |
| 2013/0200911 A1* | 8/2013 | Panagas | G01R 1/0441 324/756.01 |
| 2013/0200913 A1* | 8/2013 | Panagas | G01R 1/0441 324/756.02 |
| 2013/0200917 A1* | 8/2013 | Panagas | G01R 1/0441 324/757.01 |

* cited by examiner

*Primary Examiner* — Patrick Assouad
*Assistant Examiner* — Haidong Zhang
(74) *Attorney, Agent, or Firm* — Steven Reiss (57) ABSTRACT

A testing tray includes a receiving member and a connector. The receiving includes a tray and a latching member. The tray includes a bottom wall, a peripheral sidewall protruded from the bottom wall, a resisting member and a guide groove. The resisting member includes a resisting portion and two elastic portions coupling the resisting portion with the peripheral sidewall. The tray includes at least one latching portion protruded from the peripheral sidewall. The latching member includes a sliding portion slidably mounted on the bottom wall to cover the guide groove and an elastic member located between the sliding portion and the bottom wall. The connector includes a fixed member detachably mounted on the at least one latching portion and a conducting member detachably mounted on the fixed member. The conducting member is capable of coupling the electronic device with a testing device.

15 Claims, 7 Drawing Sheets

TESTING TRAY

FIELD

The subject matter herein particularly relates to a testing tray.

BACKGROUND

Electronic device, such as a mobile phone, or a computer including, but not limited to, a portable computer, or a tablet computer or a desktop computer, is often received in a testing tray for testing when manufacturing and assembling. However, the testing tray is often able to receive an electronic device of a single size. Therefore, there is room for improvement in the art.

BRIEF DESCRIPTION OF THE DRAWINGS

Many aspects of the present disclosure are better understood with reference to the follow drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description can be not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 1:
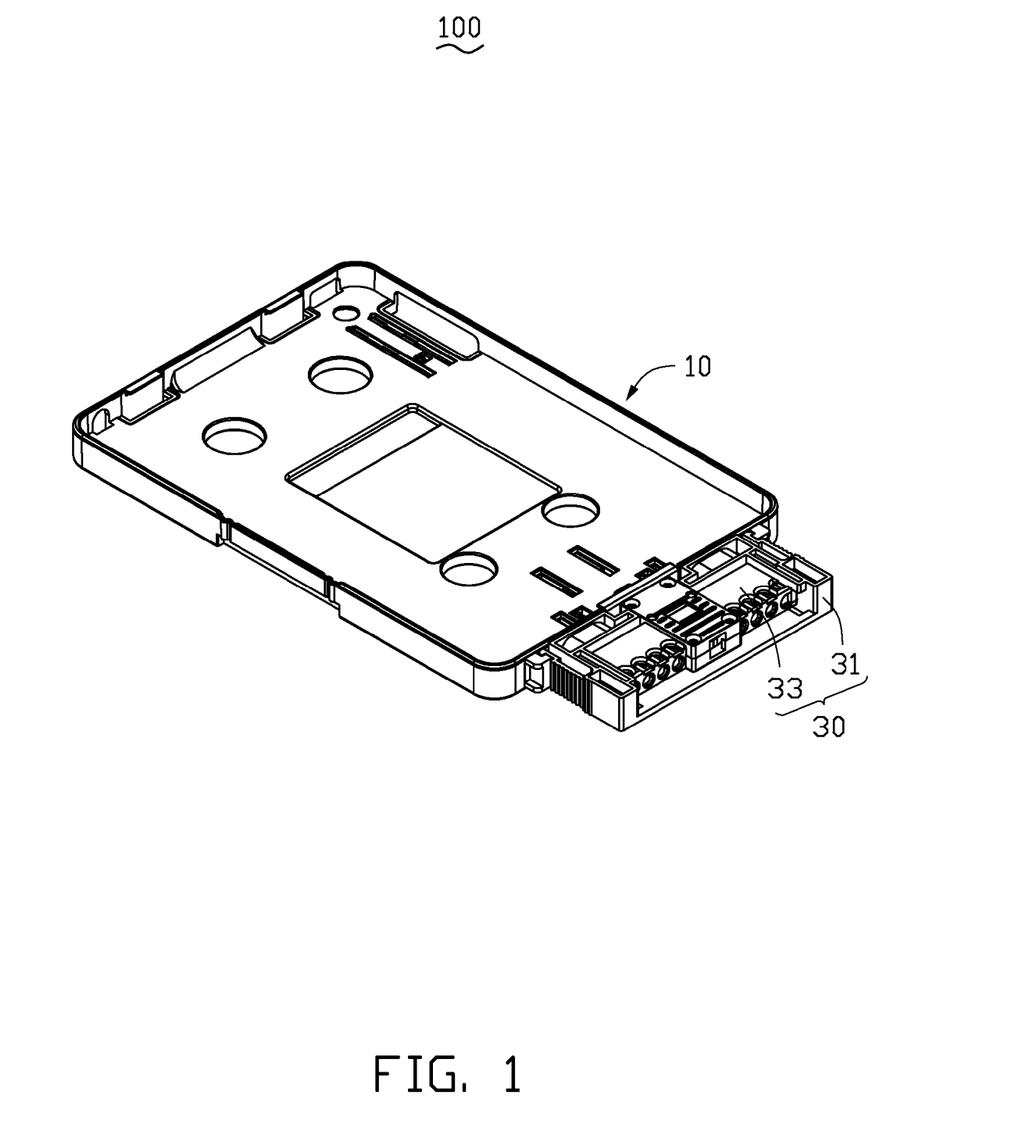
FIG. 1 is an isometric view of an embodiment of a testing tray.

FIG. 1 shows a testing tray 100. The testing tray 100 can be used to hold an electronic device (not shown), and further electrically couple the electronic device with a testing device (not shown). In at least one embodiment, the electronic device can be a mobile phone, or a computer including, but not limited to, a portable computer, or a tablet computer or a desktop computer.

The testing tray 100 can include a receiving member 10 and a connector 30 mounted on the receiving member 10. The receiving member 10 can be used to receive and hold the electronic device. The connector 30 can be used to electrically couple the electronic device with the testing device.

Figure 2:
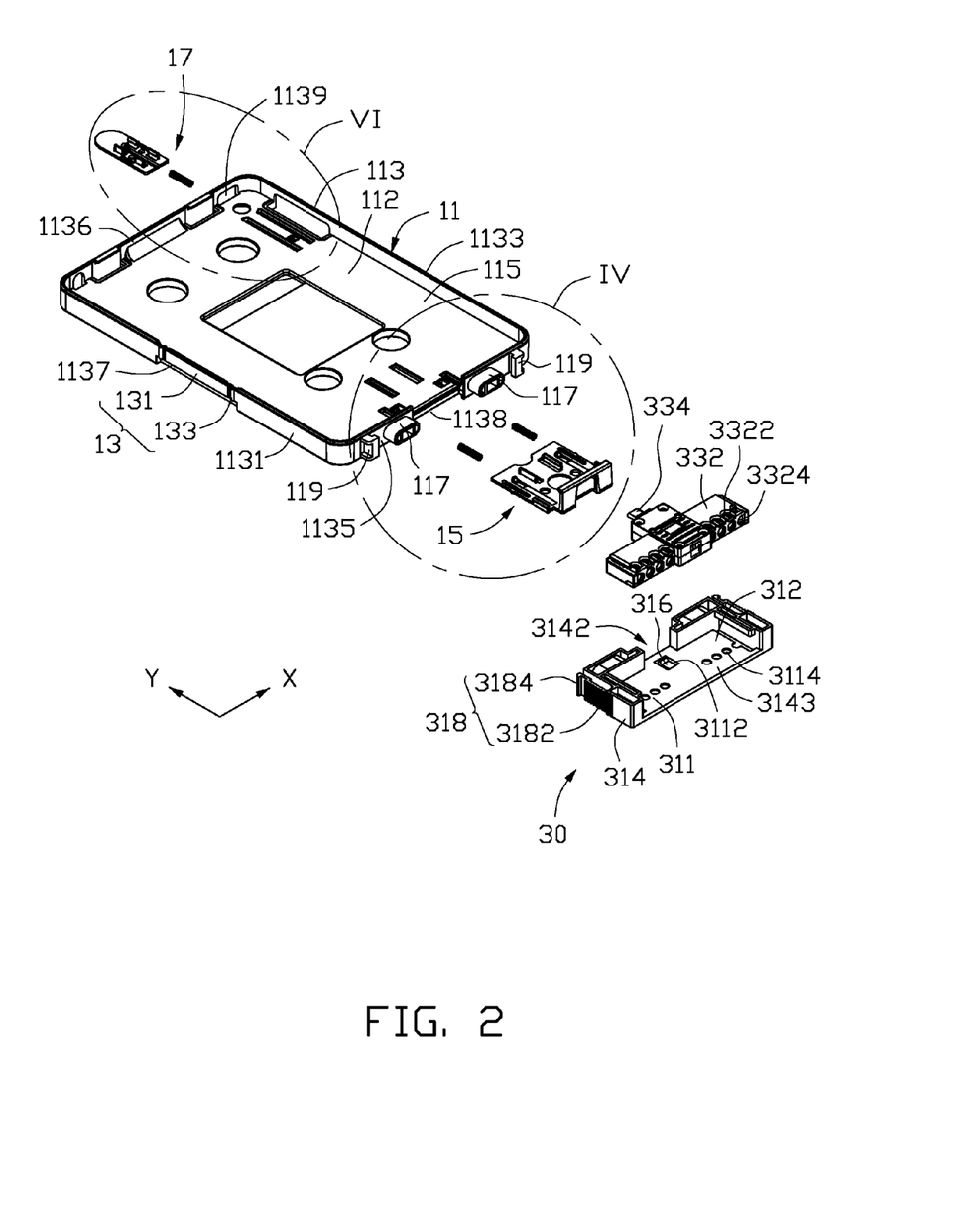
FIG. 2 is an exploded isometric view of an embodiment of the testing tray shown in FIG. 1.

Referring to FIG. 2, the receiving member 10 can include a tray 11, a latching member 15 and a shielding member 17. The latching member 15 and the shielding member 16 can be removably attached to the two opposite ends of the tray 11. The latching member 15 can be used to hold the electronic device received in the tray 11. The shielding member 17 can be used to shield a particular part of the electronic device when the particular part need not to be tested.

The tray 11 can include a bottom wall 112 and a peripheral sidewall 113 protruded from a peripheral edge of the bottom wall 112. The bottom wall 112 and the peripheral sidewall 113 can cooperatively define a receiving space 115. The receiving space 115 can be used to receive the electronic device therein. The tray 11 can further include two guiding posts 117 protruded from the peripheral sidewall 113 and two latching portions 119 protruded from the peripheral sidewall 113 too.

The peripheral sidewall 113 can be rectangular and circular shaped. The peripheral sidewall 113 can include a first sidewall 1131, and a second sidewall 1133 opposite and parallel to the first sidewall 1131, and a third sidewall 1135 and a fourth sidewall 1136 opposite and parallel to the third sidewall 1135. The first sidewall 1131 and the second sidewall 1133 can be extended along a Y-direction. The third sidewall 1135 and the fourth sidewall 1136 can be extended along a X-direction.

The first sidewall 1131 can include a resisting member 13 located on the middle thereof. The resisting member 13 can be separate with the bottom wall 112, such that the resisting member 13 and the bottom wall 112 can cooperatively define a lower slot 1137 below the resisting member 13. The resisting member 13 can include a resisting portion 131 and two elastic portions 133 located on two opposite ends of the resisting portion 131. The two elastic portions 133 can be coupled to the first sidewall 1131 respectively. In this embodiment, the two elastic portions 133 can be wrinkle-shaped. When an external force is applied on the resisting portion 131, the two elastic portions 133 can be enabled to deform along the X-direction, and the resisting portion 131 can further resist on the electronic device so as to hold the electronic device. The third sidewall 1135 can define a guide groove 1138 on the middle thereof. The fourth sidewall 1136 can define a mounting hole 1139 close to the second sidewall 1133.

Two guiding posts 117 can be protruded from the third sidewall 1135 and located on two sides of the guide groove 1138. The two latching portions 119 can be protruded from the third sidewall 1135 and further located on two sides of the two guiding posts 117. A distance between the two latching portions 119 can be greater than a distance between the two guiding posts 117. In this embodiment, the two guiding posts 117 can be symmetrically distributed on two sides of the guide groove 1138, and the two latching portions 119 can be symmetrically distributed on two sides of the two guiding posts 117 and further bent toward each other.

Figure 3:
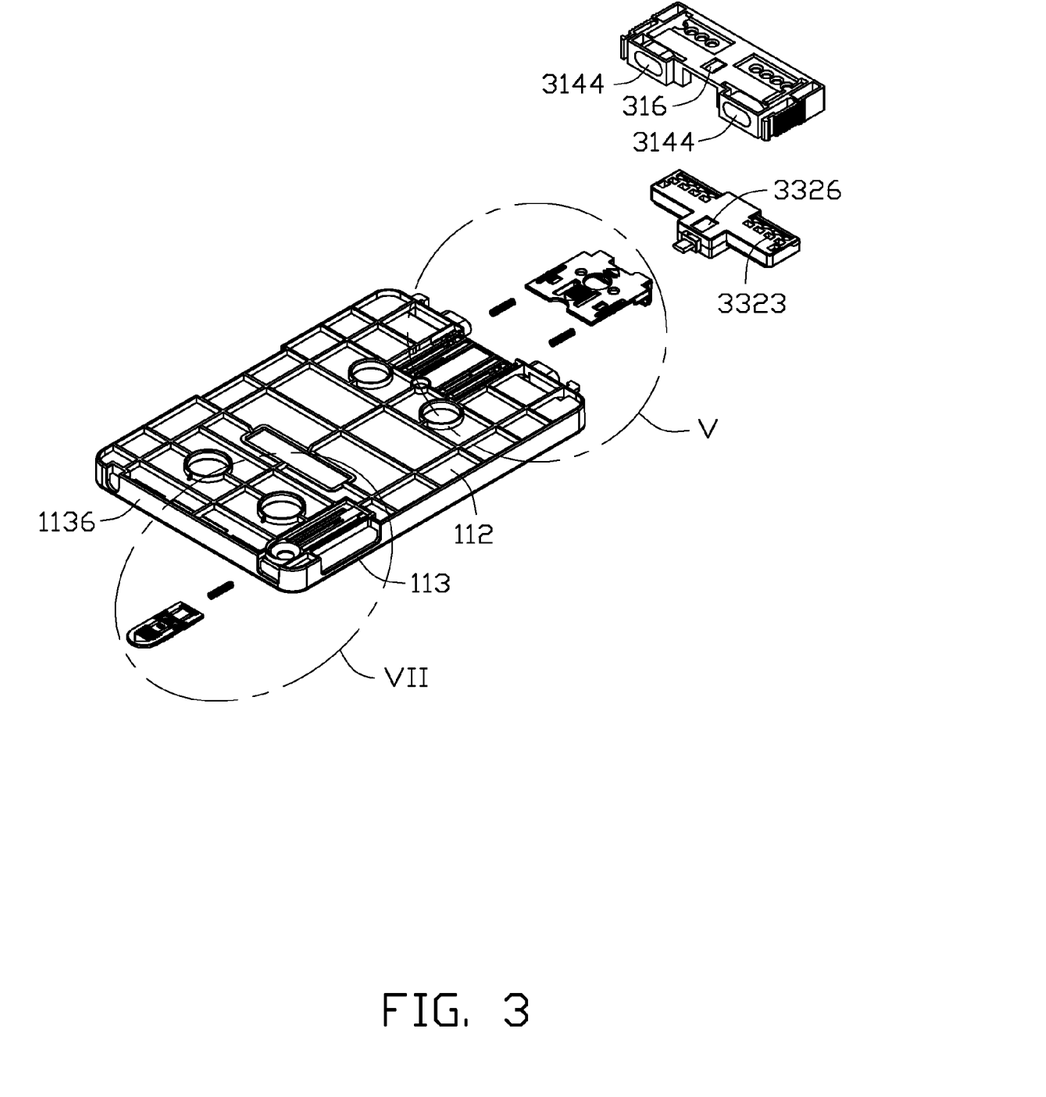
FIG. 3 is an exploded isometric view of an embodiment of the testing tray shown in FIG. 1 from another view.
Figure 4:
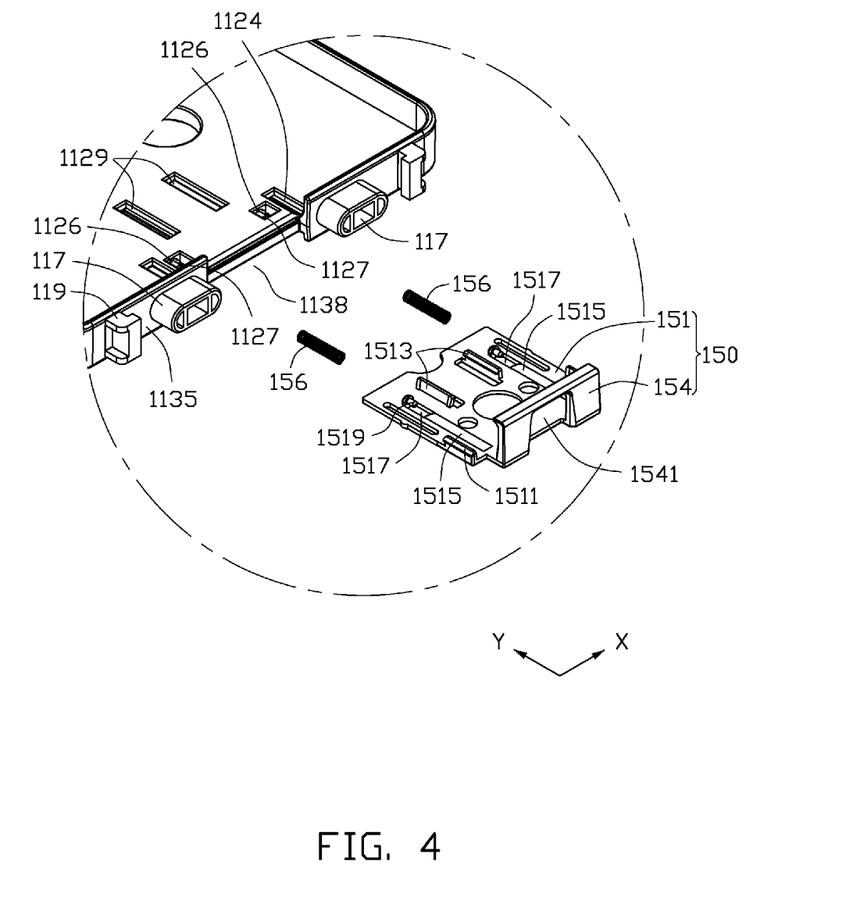
FIG. 4 is an enlarged view of the testing tray of a circle IV-IV of FIG. 2.
Figure 5:
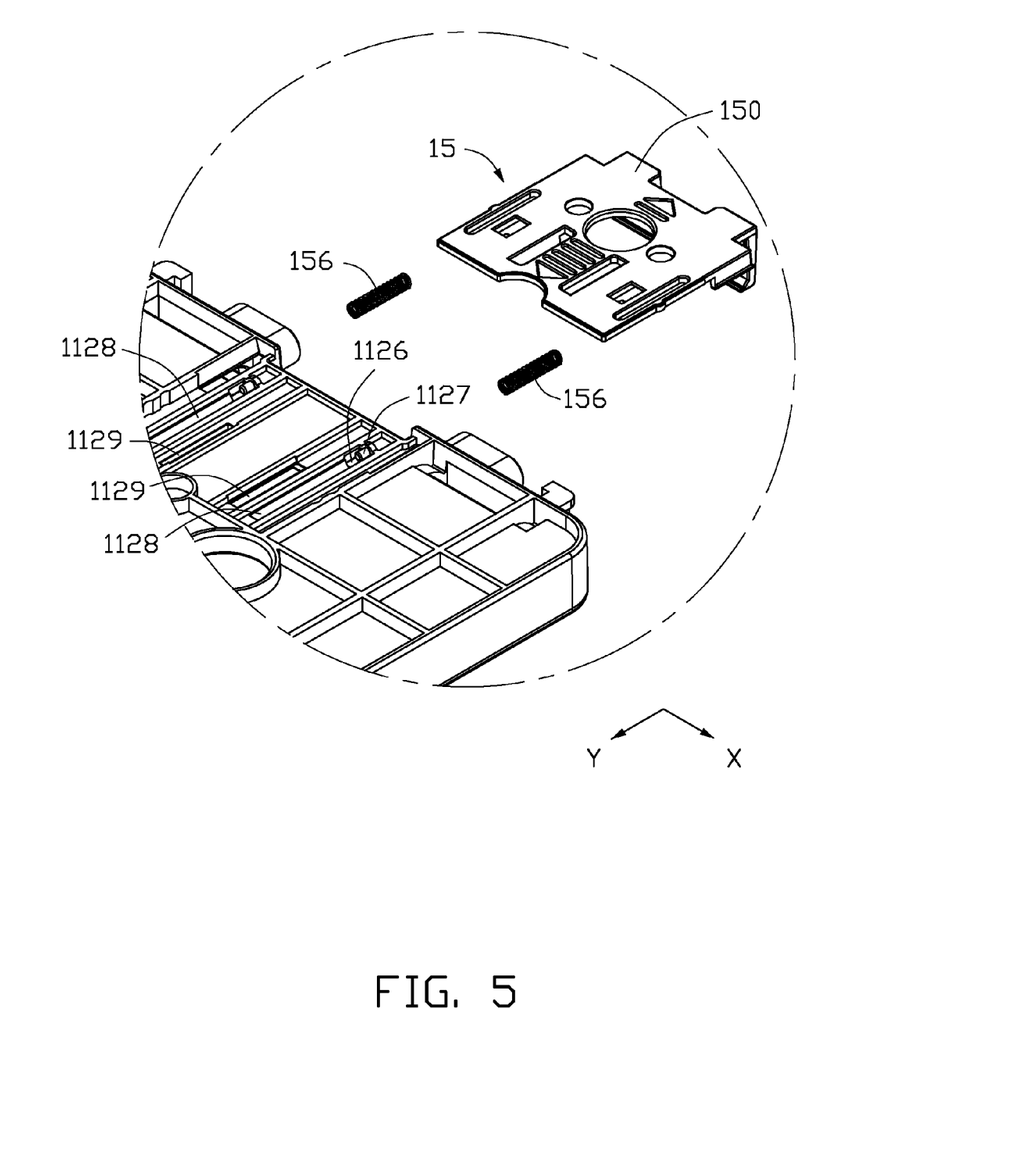
FIG. 5 is an enlarged view of the testing tray of a circle of V-V of FIG. 3.

Referring to FIGS. 3, 4 and 5, the bottom wall 112 can define two first latch grooves 1124, two first holes 1126, two first columns 1127, two first accommodating spaces 1128 (as shown in FIG. 5) and two second latch grooves 1129. The two first latch grooves 1124, the two first holes 1126, the two first columns 1127, the two first accommodating spaces 1128 and the two second latch grooves 1129 can be both symmetrically located on the two sides of the guide groove 1138 and further close to the guide groove 1138. The two first latch grooves 1124 can be cut through the bottom wall 112 and further extended along the Y-direction. The two first holes 1126 can be cut through the bottom wall 112 and further located between the two first latch grooves 1124. In this embodiment, the two first columns 1127 can be substantially cylinder-shaped. Each first column 1127 can be protruded from a wall of the first hole 1126 and further extended along the Y-direction and toward the fourth sidewall 1136. The two first accommodating spaces 1128 can be defined on a bottom surface of the bottom wall 112. Each first accommodating space 1128 can be aligned with one of the two first holes 1126. The two second latch grooves 1129 can be parallel with each other, and further located between the two first accommodating spaces 1128. The two second latch grooves 1129 can be located on one side of the two first latch grooves 1124 away from the guide groove 1138.

Figure 6:
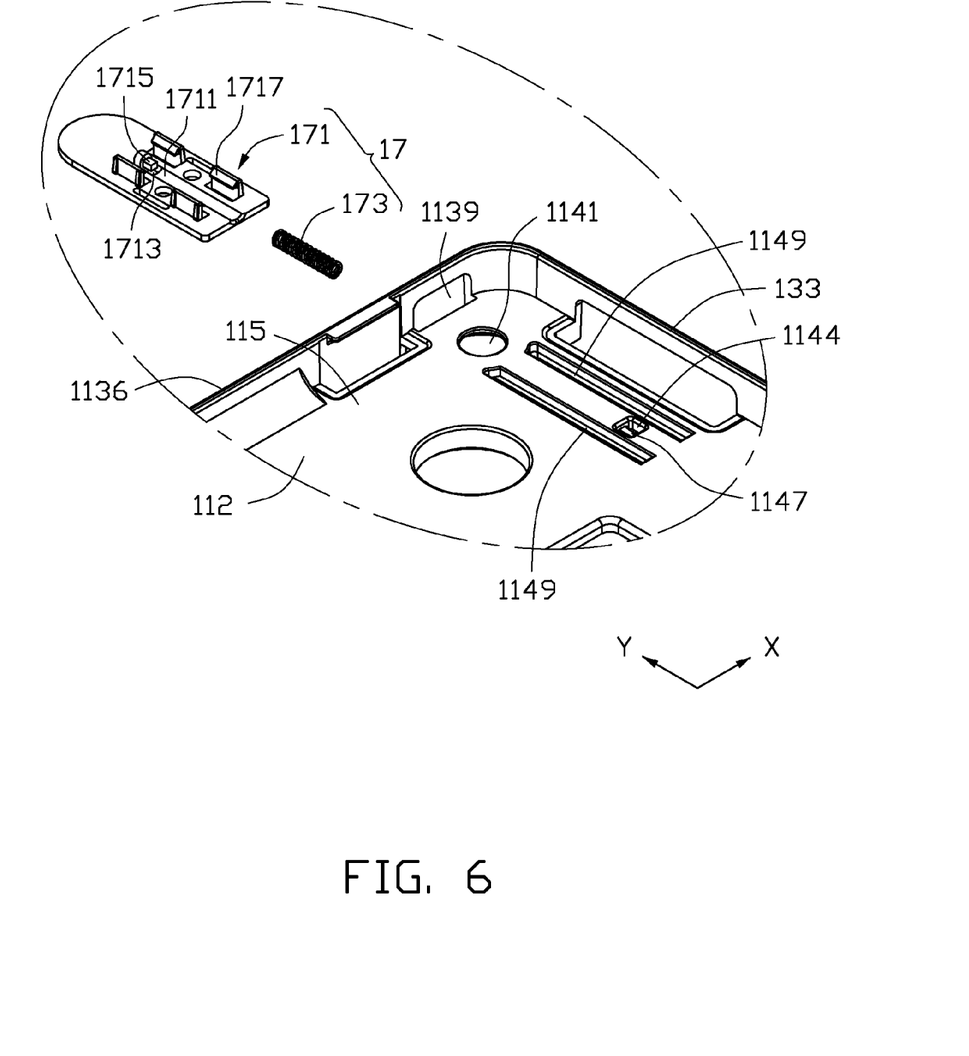
FIG. 6 is an enlarged view of the testing tray of a circle of VI-VI of FIG. 2.
Figure 7:
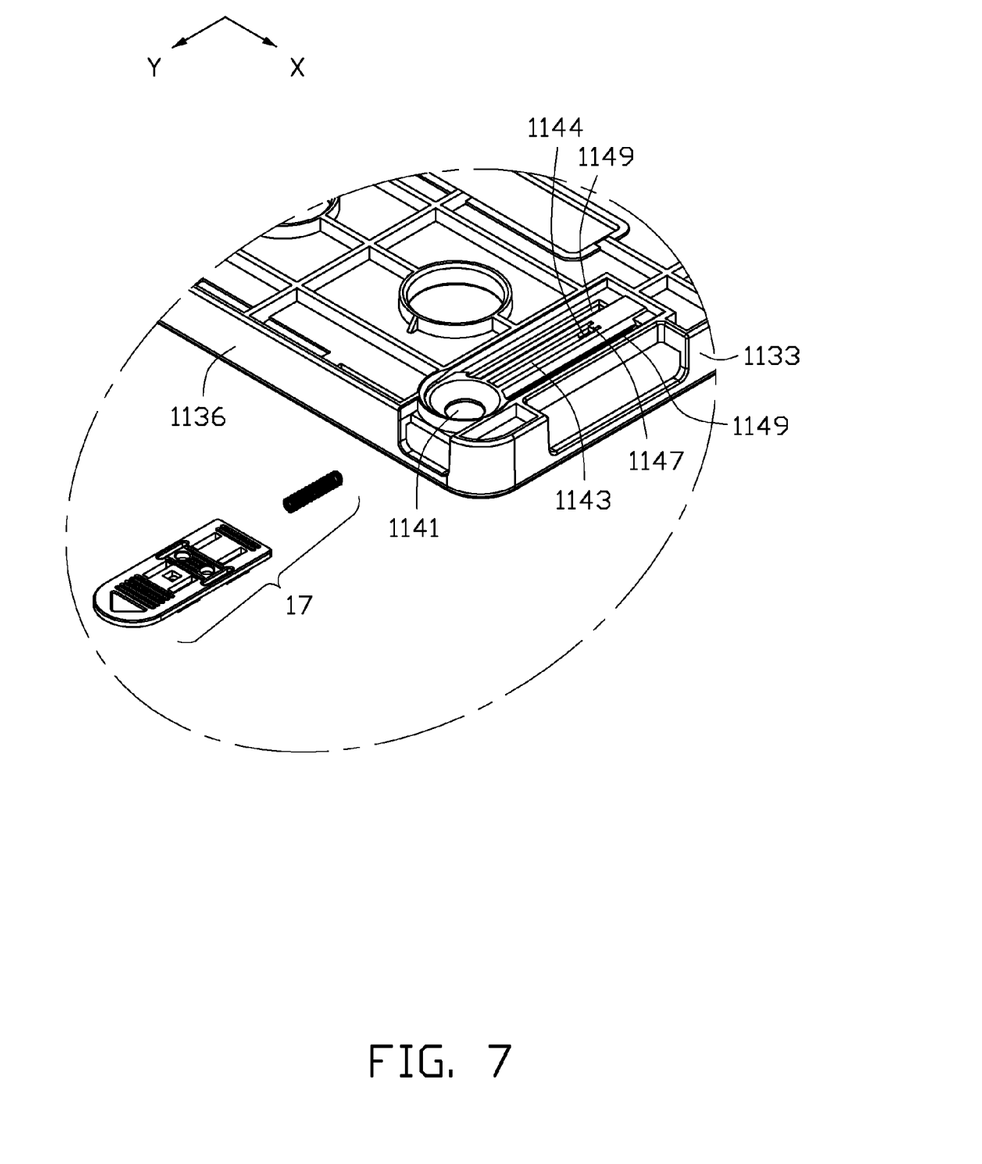
FIG. 7 is an enlarged view of the testing tray of a circle of VII-VII of FIG. 3.

Referring to FIGS. 2, 6 and 7, the bottom wall 112 can define a shield hole 1141, a first receiving space 1143, a first through hole 1144, a first protrusion 1147 and two latch grooves 1149. The shield groove 1141 can be cone-shaped and located close to the mounting hole 1139, and further cut through the bottom wall 112. The first receiving space 1143 can be defined on the bottom surface of the bottom wall 112, and further extended from the shield hole 1141 along a direction perpendicular to the third sidewall 1135. The first through hole 1144 can be defined on one side of the first receiving space 1143 away from the shield hole 1141. The first protrusion 1147 can be protruded from a wall of the first through hole 1144 and further extended along a direction close to the shield hole 1141. The two latch grooves 1149 can be symmetrically distributed on two sides of the first receiving space 1143.

Referring to FIGS. 3, 4 and 5, the latching member 15 can be removeably attached to one end of the tray 11 which is close to the guide groove 1138. The latching member 15 can include a sliding portion 150 and two elastic members 156. The sliding portion 150 can be slidably mounted on the bottom wall 112, and can slide along the Y-direction so as to hold the electronic device with the tray 11. The sliding portion 150 can include a sliding portion 151 and a bending portion 154 bending from one end of the sliding portion 151. The sliding portion 151 can be rectangular-shaped and further include two first hooks 1511, two second hooks 1513, two second accommodating spaces 1515, two second holes 1517, and two second columns 1519. In this embodiment, the two first hooks 1511, the two second hooks 1513, the two accommodating spaces 1515, the two second holes 1517 and the two second columns 1519 can be both symmetrically distributed on two sides of the sliding portion 151. The two first hooks 1511 and the two second hooks 1513 can be both protruded from an upper surface of the sliding portion 151 facing the bottom wall 112. The two second hooks 1513 can be located on one side of the two first hooks 1511 away from the bending portion 154. A distance between the two second hooks 1513 can be less than a distance between the two first hooks 1511. The two first hooks 1511 can be opposite to each other. The two second hooks 1513 can be faced with each other. Each first hook 1511 can be slidably received in one of the two first latch grooves 1124. Each second hook 1513 can be slidably received in one of the two second latch grooves 1129. Thus, the latching member 15 can be engaged with the bottom wall 112. The two second accommodating spaces 1515 can be defined on the upper surface of the sliding portion 151. Each second accommodating space 1515 can be corresponding to one of the two first accommodating spaces 1128. Each second accommodating space 1515 can be located between one of the two first hooks 1511 and one of the two second hooks 1513. Each second hole 1517 can be located on one side of one of the two first accommodating spaces 1128 away from the bending portion 154, and further opposite to the first hole 1126. Each second column 1519 can be protruded from a wall of one of the two second holes 1517, and further opposite to one of the two first columns 1127. The bending portion 154 can be substantially perpendicular to the sliding portion 151, and further received in the guide groove 1138 to cover the guide groove 1138. The bending portion 154 can further define a first opening 1541 on a middle thereof. Each elastic member 156 can be accommodated in one of the two first accommodating spaces 1128 and one of the two second accommodating spaces 1515. The two ends of the each elastic member 156 can be sleeved on one of the two first columns 1127 and one of the two second columns 1519. When the sliding portion 150 is driven to slide along the Y-direction away from the tray 11 by an external force applied thereon, the two elastic members 156 can be compressed accordingly. When the external force is withdrawn, the elastic restoring force of the two elastic members 156 can drive the sliding portion 150 to return its initial position, and the bending portion 154 can cover the guide groove 1138 again.

Referring to FIGS. 6 and 7, the shielding member 17 can be removeably attached to the bottom surface of the bottom wall 112 and further close to the mounting hole 1139. The shielding member 7 can include a shielding body 171 and a return member 173. The shielding body 171 can slidably cover the shield hole 1141 or expose the shield hole 1141. The return member 173 can be elastically located between the shielding body 171 and the tray 11.

The shielding body 171 can be substantially strip-shaped. The shielding body 171 can define a second receiving space 1711, a second through hole 1713, a second protrusion 1715 and two pairs of hooks 1717. The second receiving space 1711 can be corresponding to the first receiving space 1143, and further defined on an upper surface of the shielding body 171 facing the bottom wall 112. The second through hole 1713 can be interconnected with the second receiving space 1711. The second protrusion 1715 can be protruded from a wall of the second through hole 1713 and further bent toward the third sidewall 1135. The two pairs of hooks 1717 can be separately located on the upper surface of the shielding body 171. The two pairs of hooks 1717 can be symmetrically distributed on two sides of the second through hole 1713. One pair of hooks 1717 can be slidably received in one latch groove 1149, and the other pair of hooks 1717 can be slidably received in the other latch groove 1149 so as to engage the shielding member 17 with the bottom wall 112.

The return member 173 can be received in the first receiving space 1143 and the second receiving space 1711.

The two ends of the return member 173 can be sleeved on the first protrusion 1147 and the second protrusion 1715 respectively. When the shielding body 171 is driven to slide along the Y-direction, the second protrusion 1715 can resist the return member 173 to compress the return member 173, and the shielding member 1141 can thus expose the shield hole 1141. When the external force is withdrawn, the elastic restoring force of the return member 173 can drive the shielding body 171 to return its initial position, and the shielding body 171 can cover the shield hole 1141 again.

Referring to FIGS. 1, 2 and 3, the connector 30 can include a fixed member 31 detachably mounted on the tray 11 and a conducting member 33 detachably mounted on the fixed member 31. In detail, the fixed member 31 can be detachably mounted on the third sidewall 1135 of the tray 11, and the conducting member 33 can be used to electrically couple the electronic device received in the receiving space 115 with the testing device. The fixed member 31 can include a bottom 311, two mounting portions 314, a limited portion 316 and two claspers 318. The bottom 311 can be rectangular-shaped. The bottom 311 can define a limit groove 3112 on one end of the bottom 311 close to the tray 11, and further define eight openings 3114 on other end of the bottom 311 away from the tray 11. The two mounting portions 314 can be substantially L-shaped, and further located on two sides of the bottom 311. The two mounting portions 314 and the bottom 311 can cooperatively form a receiving portion 312. The two mounting portions 314 can further cooperatively form a notch 3142 and a second opening 3143. Each mounting portion 314 can define a guide hole 3144 corresponding to one of the two guiding posts 117. Each guiding post 117 can receive in one of the two guide holes 3144 so as to engage the fixed member 31 with the tray 11. The limited portion 316 can be rectangular-shaped. The limited portion 316 can be protruded from a wall of the limit groove 3112 and further bent towards the tray 11 to form a hook-shaped structure. The two claspers 318 can be formed on the two mounting portions 314 respectively. Each clasper 318 can include a pressing end 3182 and a clasping hook 3184. Each pressing end 3182 can be extended from one of the two mounting portions 314 to the tray 11. Each pressing end 3182 can be deformed along the X-direction when an external force applied thereon. Each clasping hook 3184 can be located on a free end of one pressing end 3182. Each clasping hook 3184 can be engaged with one of the two latching portions 119 so as to engage the fixed member 31 with the tray 11.

The conducting member 33 can be partially received in the receiving portion 312 and further located on one end of the tray 11 close to the latching member 15. The conducting member 33 can include a supporting portion 332 received in the receiving portion 312 and a conducting portion 334 located on the supporting portion 332. The supporting portion 332 can be box-shaped. The supporting portion 332 can define a number of ports 3322 on an upper surface thereof, a number of ports 3323 on a bottom surface thereof and a number of ports 3324 on an end thereof away from the tray 11. The ports 3322, 3323 and 3324 can be interconnected with each other. Therein, the ports 3323 can be aligned to the second opening 3114. The supporting portion 332 can further define a slot 3326 on the bottom surface. The slot 3326 can be corresponding to the limited portion 316. The conducting portion 334 can include a plug (not shown) and a number of conducting pieces (not shown) electrically coupled to the plug. The plug can plug into the first opening 1541 and further electrically couple with the electronic device received in the tray 11. The conducting pieces can be received in the supporting portion 332. When in testing, the conducting pins of the testing device can pass through the ports 3322, 3323, and 3324 and further electrically coupled with the conducting pieces respectively.

When in assembly, the latching member 15 and the shielding member 17 can be mounted in the tray 11 in sequence. The fixed member 31 can be engaged with the third sidewall 1135 of the tray 11. The conducting member 33 can pass the second opening 3143 and be further fixed to the fixed member 31.

When in use, the sliding portion 150 can be pushed to slide away from the third sidewall 1135 to a defined position so as to put the electronic device in the receiving portion 115, and the sliding portion 150 can be then pulled to return its initial position by the two elastic members 156, the electronic device can be thus fixed along the Y-direction. The two elastic portions 133 can be enabled to deform along the X-direction, and the resisting portion 131 can further resist on the electronic device so as to hold the electronic device along the X-direction. The fixed member 31 can be engaged with the third sidewall 1135 of the tray 11. The conducting member 33 can pass the second opening 3143 and be further fixed to the fixed member 31. The conducting member 33 can be coupled between the electronic device and the testing device. Thus, the testing device can be used to test the electronic device received in the tray 11.

If the electronic device has a front-facing camera and a rear camera. When testing the front-facing camera, the electronic device can be received in the receiving portion 115, and the shielding member 17 can cover the rear camera, thus, the testing device can test the front-facing camera. When testing the rear camera, the electronic device can be received in the receiving portion 115, and the shielding member 17 can be pushed to slide to expose the shield hole 1141, the rear camera can be coaxial to the shield hole 1141 by an external force applied on the resisting member 13, and the rear camera can be thus tested by the testing device.

After testing, the shielding member 17 can be pulled to return to its initial position, so as to shield the shield hole 1141 again. The connector 30 can be taken down from the tray 11. The connector 30 can be fixed to the different trays 11 which have different sizes, so as to test the different electronic devices which have different sizes.

In at least one embodiment, the number of the latching portions 119, the mounting portions 314, the claspers 318, the guiding posts 117 and the guide holes 3144 can be but not limited to two.

In at least one embodiment, the number of the first accommodating spaces 1128, the second accommodating spaces 1515 and the elastic members 156 can be but not limited to two.

In at least one embodiment, the first hole 1126 and the second hole 1517 can be omitted. The first columns 1217 can be protruded from the wall of first accommodating space 1128 and the second columns 1519 can be protruded from the wall of the second accommodating space 1515 accordingly.

In at least one embodiment, the first through hole 1144 and the second through hole 1713 can be omitted. The first protrusion 1147 can be protruded from the wall of the first receiving space 1143 and the second protrusion 1715 can be protruded from the wall of the second receiving space 1711.

In at least one embodiment, the bottom 311, the mounting portions 314 and the limited groove 316 can be omitted. The supporting portion 332 can be omitted. The claspers 318 can be located on the outside of the conducting portion 334.

In at least one embodiment, the shielding member 17 can be omitted.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A testing tray for receiving an electronic device, the testing tray comprising:
a receiving member, comprising
a tray comprising a bottom wall and a peripheral sidewall protruded from the bottom wall; the bottom wall and the peripheral sidewall cooperatively defining a receiving space configured to receive the electronic device; the peripheral sidewall comprising a first sidewall, and a second sidewall opposite and parallel to the first sidewall, and a third sidewall, and a fourth sidewall opposite and parallel to the third sidewall; the bottom wall defining two first latch grooves and two second latch grooves; the tray further comprising a resisting member defined on the first sidewall and a guide groove defined on the third sidewall; the resisting member comprising a resisting portion and two elastic portions coupling two ends of the resisting portion with the peripheral sidewall respectively; the two first latch grooves cutting through the bottom wall and further extended from the guide groove to the fourth sidewall, the two second latch grooves cutting through the bottom wall; the tray further comprising at least one latching portion protruding from the peripheral sidewall and located proximate the guide groove; and
a latching member comprising a sliding portion and an elastic member, the sliding portion slidably mounted on the bottom wall, facing the guide groove and covering the guide groove; the elastic member located between the sliding portion and the bottom wall; the sliding portion defining two first hooks and two second hooks, the two first hooks and the two second hooks both protruded from the sliding portion, each first hook slidably received in one of the two first latch grooves, and each second hook slidably received in one of the two second latch grooves; and
a connector comprising a fixed member detachably mounted on the latching portion and a conducting member detachably mounted on the fixed member, the conducting member being configured to couple the electronic device and a testing device.

2. The testing tray of claim 1, wherein the bottom wall defines a first accommodating space and a first column, the first accommodating space is defined on the bottom wall and further extended from the guide groove to the fourth sidewall, the first column is protruded from the first accommodating space and further extended toward the fourth sidewall; the sliding portion comprises a second accommodating space defined on the sliding portion and a second column protruded from the second accommodating space, the elastic member is received in the first accommodating space and the second accommodating space, and further sleeved on the first column and the second column.

3. The testing tray of claim 1, wherein the bottom wall defines a shield hole, a first receiving space and a first protrusion, the first receiving space is extended from the shield hole to the fourth sidewall, the first protrusion is protruded from the first receiving space and further extended toward the shield hole; the testing tray further comprises a shielding member, the shielding member comprises a shielding body and a return member, the shielding body defines a second receiving space and a second protrusion, the second protrusion is protruded from the second receiving space, the return member is received in the first receiving space and the second receiving space, and further sleeved on the first protrusion and the second protrusion.

4. The testing tray of claim 3, wherein the bottom wall defines two latch grooves, the two latch grooves are symmetrically defined on the first receiving space; the shielding body defines two pairs of hooks, the two pairs of hooks are separately located on the shielding body, the two pairs of hooks are symmetrically distributed on the second through hole, one pair of hooks are slidably received in one latch groove, and the other pair of hooks are slidably received in the other latch groove.

5. The testing tray of claim 1, wherein the fixed member comprises a bottom and at least one mounting portion located on the bottom, the at least one mounting portion and the bottom cooperatively form a receiving portion, the fixed member further comprises at least one clasper, each clasper is formed on one of the at least one mounting portion; the conducting member comprises a supporting portion received in the receiving portion and a conducting portion located on the supporting portion, a plug is protruded from the conducting portion and further extended toward the tray.

6. The testing tray of claim 5, wherein the clasper comprises a pressing end and a clasping hook, the pressing end is extended from the mounting portion to the tray, the clasping hook is located on the pressing end, each of at least one clasping hook is engaged with one of the at least one latching portion so as to engage the fixed member with the tray.

7. The testing tray of claim 5, wherein the tray comprises at least one guiding post protruded from the peripheral sidewall, each mounting portion defines a guide hole corresponding to one of the at least one guiding post, each guiding post receives in one of the at least one guide hole to engage the fixed member with the tray.

8. The testing tray of claim 5, wherein the supporting portion defines a slot, the bottom defines a limit groove corresponding to the slot, the fixed member comprises a limited portion, the limited portion is protruded from the limit groove and further bent towards the tray, the limit portion receives in the limit groove to limit the fixed member.

9. A testing tray for receiving an electronic device, the testing tray comprising:
a receiving member, comprising
a tray comprising a bottom wall and a peripheral sidewall protruded from the bottom wall; the bottom wall and the peripheral sidewall cooperatively defining a receiving space configured to receive the electronic device; the peripheral sidewall comprising a first sidewall, and a second sidewall opposite and parallel to the first sidewall, and a third sidewall, and a fourth sidewall opposite and parallel to the third sidewall; the tray further comprising a resisting member defined on the first sidewall and a guide groove defined on the third sidewall; the resisting member comprising a resisting portion and two elastic portions coupling the resisting portion with the peripheral sidewall; the tray further comprising at least one latching portion protruding from the peripheral sidewall and located proximate the guide groove; the bottom wall defining a first accommodating space and a first column, the first accommodating space extended from the guide groove to the fourth sidewall, the first column being protruded from the first accommodating space and further extended toward the fourth sidewall; and a latching member comprising a sliding portion and an elastic member, the sliding portion slidably mounted on the bottom wall and covering the guide groove; the sliding portion comprising a second accommodating space defined on the sliding portion and a second column protruded from the second accommodating space, the elastic member being received in the first accommodating space and the second accommodating space, and further sleeved on the first column and the second column; and a connector comprising a fixed member detachably mounted on the latching portion and a conducting member detachably mounted on the fixed member, the conducting member being configured to couple the electronic device and a testing device.

10. The testing tray of claim 9, wherein the bottom wall defines two first latch grooves and two second latch grooves, the two first latch grooves cut through the bottom wall and further extended from the guide groove to the fourth sidewall, the two second latch grooves cut through the bottom wall; the sliding portion defines two first hooks and two second hooks, the two first hooks and the two second hooks are both protruded from the sliding portion, each first hook is slidably received in one of the two first latch grooves, and each second hook is slidably received in one of the two second latch grooves.

11. The testing tray of claim 9, wherein the bottom wall defines a shield hole, a first receiving space and a first protrusion, the first receiving space is extended from the shield hole to the fourth sidewall, the first protrusion is protruded from the first receiving space and further extended toward the shield hole; the testing tray further comprises a shielding member, the shielding member comprises a shielding body and a return member, the shielding body defines a second receiving space and a second protrusion, the second protrusion is protruded from the second receiving space, the return member is received in the first receiving space and the second receiving space, and further sleeved on the first protrusion and the second protrusion.

12. The testing tray of claim 11, wherein the bottom wall defines two latch grooves, the two latch grooves are symmetrically defined on the first receiving space; the shielding body defines two pairs of hooks, the two pairs of hooks are separately located on the shielding body, the two pairs of hooks are symmetrically distributed on the second through hole, one pair of hooks are slidably received in one latch groove, and the other pair of hooks are slidably received in the other latch groove.

13. A testing tray for receiving an electronic device, the testing tray comprising:
a receiving member, comprising
a tray comprising a bottom wall and a peripheral sidewall protruded from the bottom wall; the bottom wall and the peripheral sidewall cooperatively defining a receiving space configured to receive the electronic device; the tray further comprising a resisting member located on the peripheral sidewall and a guide groove defined on the peripheral sidewall; the resisting member comprising a resisting portion and two elastic portions coupling the resisting portion with the peripheral sidewall; the tray further comprising at least one latching portion protruding from the peripheral sidewall and located proximate the guide groove; and
a latching member comprising a sliding portion and an elastic member, the sliding portion slidably mounted on the bottom wall and covering the guide groove; the elastic member located between the sliding portion and the bottom wall; and
a connector comprising a fixed member detachably mounted on the latching portion and a conducting member detachably mounted on the fixed member, the conducting member being configured to couple the electronic device and a testing device;
wherein the fixed member comprises a bottom and at least one mounting portion located on the bottom, the at least one mounting portion and the bottom cooperatively form a receiving portion, the fixed member further comprises at least one clasper, each clasper is formed on one of the at least one mounting portion; the conducting member comprises a supporting portion received in the receiving portion and a conducting portion located on the supporting portion, a plug is protruded from the conducting portion and further extended toward the tray; and
wherein the clasper comprises a pressing end and a clasping hook, the pressing end is extended from the mounting portion to the tray, the clasping hook is located on the pressing end, each of at least one clasping hook is engaged with one of the at least one latching portion so as to engage the fixed member with the tray.

14. The testing tray of claim 13, wherein the tray comprises at least one guiding post protruded from the peripheral sidewall, each mounting portion defines a guide hole corresponding to one of the at least one guiding post, each guiding post receives in one of the at least one guide hole to engage the fixed member with the tray.

15. The testing tray of claim 13, wherein the supporting portion defines a slot, the bottom defines a limit groove corresponding to the slot, the fixed member comprises a limited portion, the limited portion is protruded from the limit groove and further bent towards the tray, the limit portion receives in the limit groove to limit the fixed member.

* * * * *